(12) United States Patent
Mashima et al.

(10) Patent No.: US 9,082,436 B1
(45) Date of Patent: Jul. 14, 2015

(54) ZIG-ZAG MIMO HEAD REDUCING SPACE BETWEEN THREE SENSORS

(71) Applicant: HGST Netherlands B.V., Amsterdam (NL)

(72) Inventors: Hideki Mashima, Odawara (JP); Nobuo Yoshida, Hiratsuka (JP); Iwata Norihiro, Odawara (JE); Tsutomu Yasuda, Odawara (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/173,758

(22) Filed: Feb. 5, 2014

(51) Int. Cl.
*G11B 5/39* (2006.01)

(52) U.S. Cl.
CPC ............ *G11B 5/3951* (2013.01); *G11B 5/3948* (2013.01)

(58) Field of Classification Search
CPC .. G11B 2005/3996; G11B 5/265; G11B 5/39; G11B 5/3945; G11B 5/3948; G11B 5/3951; G11B 5/3954; G11B 5/397; G11B 5/3974; G11B 5/3977
USPC .................................................. 360/314–316
See application file for complete search history.

(56) References Cited

U.S. PATENT DOCUMENTS

| | | | |
|---|---|---|---|
| 5,309,305 A | 5/1994 | Nepela et al. | |
| 5,508,868 A | 4/1996 | Cheng et al. | |
| 5,721,008 A | 2/1998 | Huang et al. | |
| 6,104,562 A | 8/2000 | Ottesen et al. | |
| 6,271,998 B1 * | 8/2001 | Coehoorn et al. | 360/324.2 |
| 6,717,780 B2 | 4/2004 | Hiramoto et al. | |
| 6,999,285 B2 * | 2/2006 | Gill | 360/314 |
| 7,027,268 B1 * | 4/2006 | Zhu et al. | 360/314 |
| 7,298,586 B1 * | 11/2007 | Campos et al. | 360/125.38 |
| 7,382,585 B1 | 6/2008 | Nibarger et al. | |
| 7,751,148 B1 * | 7/2010 | Alstrin et al. | 360/241.1 |
| 8,208,228 B2 | 6/2012 | Maat et al. | |
| 8,711,517 B2 * | 4/2014 | Erden et al. | 360/121 |
| 8,786,987 B2 * | 7/2014 | Edelman et al. | 360/324.12 |
| 2005/0248870 A1 | 11/2005 | Monk et al. | |
| 2010/0020435 A1 | 1/2010 | Chen et al. | |
| 2012/0206830 A1 | 8/2012 | Gao et al. | |
| 2014/0063644 A1 * | 3/2014 | Lou et al. | 360/75 |
| 2014/0177102 A1 * | 6/2014 | Kief et al. | 360/128 |

FOREIGN PATENT DOCUMENTS

| | | | |
|---|---|---|---|
| JP | 2001102659 A | * | 4/2001 |
| WO | 0167439 A1 | | 9/2001 |

OTHER PUBLICATIONS

Ching Tsang et al.; "Gigabit Density Recording Using Dual-Element MR/Inductive Heads on Thin-Film Disks"; IEEE Transactions on Magnetics, vol. 26, No. 5, Sep. 1990; 5 pages.

* cited by examiner

*Primary Examiner* — Will J Klimowicz
(74) *Attorney, Agent, or Firm* — Patterson & Sheridan, LLP

(57) ABSTRACT

The embodiments disclosed generally relate to a magnetic recording head having three magnetoresistive effect elements. The structure comprises a first magnetoresistive effect element on a lower magnetic shield layer. Additionally, two lower electrodes are disposed on the two sides of the first magnetoresistive effect element. A second magnetoresistive effect element is disposed on a lower electrode while a third magnetoresistive effect element on another lower electrode. An upper magnetic shield layer is disposed between the second magnetoresistive effect element and the third magnetoresistive effect element. The upper magnetic shield also serves as an electrode of the first magnetoresistive effect element.

11 Claims, 17 Drawing Sheets

ZIG-ZAG MIMO HEAD REDUCING SPACE BETWEEN THREE SENSORS

BACKGROUND OF THE INVENTION

1. Field of the Invention

Embodiments disclosed herein generally relate to a current perpendicular to plane (CPP) type magnetoresistive effect head as a magnetic reproduction head, and a magnetic recording and reproduction device in which the CPP type magnetoresistive effect head is installed.

2. Description of the Related Art

Magnetoresistive effect magnetic heads are used as sensors for reproducing magnetic information recorded on magnetic media in high density magnetic recording devices such as hard disks, and is a part that greatly affects the performance of magnetic recording technology.

In recent years, magnetic reproduction heads are used that use the so-called giant magnet resistive effect (hereafter referred to as GMR), and so on, namely the magnetoresistive effect of a multilayer film in which ferromagnetic metal layers are stacked with nonmagnetic intermediate layers therebetween. The first GMR heads used were the current in plane (CIP) type in which an electrical signal flows parallel within the plane of a sensor film. In order to increase the recording density, the tunneling magnet resistive effect (TMR) head and the current perpendicular to a plane giant magnet resistive effect (GMR) head were developed considering the advantage of high output with narrow tracks and narrow gaps, so in recent years TMR heads have become the mainstream in magnetic reproduction heads. Unlike the conventional GMR head, the TMR head and the CPP-GMR head are CPP type heads in which electrical signals flow in the direction perpendicular to the film surface, and this is the major difference from CIP type heads in which the electrical signal flows parallel within the plane of the sensor film.

In order to respond to the demand for even higher density recording in recent years, the effective track width of magnetoresistive sensors has been made narrower, but this has caused the element resistance to increase, the noise to increase, and sensitivity to reduce, and has produced the separate issue that it is difficult to increase the sensitivity. In order to further increase the density three element type magnetic heads have been proposed as shown in FIG. 1.

The magnetic head in FIG. 1 includes a lower shield/electrode layer 101 having two magnetoresistive effect elements 113, 114 disposed thereover. An insulating layer 104 is disposed over the lower shield layer 101 and along a portion of the two magnetoresistive effect elements 113, 114. Over the insulating layer 104, an element side layer 110 is present. The element side layer 110 is also disposed between the two magnetoresistive effect elements 113, 114. A mask pattern 118 is formed over the element side layer, insulating layer 104 and magnetoresistive effect element 113 while an upper electrode forming film 119 is formed over the element side layer 110, insulating layer 104 and magnetoresistive effect element 114. Another insulating layer 104 is formed over the mask pattern 118, exposed element side layer 110 and upper electrode forming film 119. A second upper electrode 120 is then formed over the upper electrode forming film 119 and the element side layer 110. A magnetoresistive effect element 102, magnetic domain control film 117 and upper shield layer 112 are formed thereover.

The advantage of three element magnetic heads is that by producing a magnetic head having several elements whose size is larger than the bit size of the medium, it is possible to read the bit data from the differences of the plurality of signals obtained. Because the element size can be larger than for a single element, noise can be controlled and sensitivity increased.

Each of the elements of the three element type reproduction element can be produced at a size that is larger than the recording bit size, but in order to extract the signal it is necessary to provide wiring layers between the first magnetoresistive effect element and the first magnetoresistive effect element and the second magnetoresistive effect element, the third magnetoresistive effect element. Therefore if terminals are provided, the distance between each element is increased and the distance between shields is increased.

It is an object of the disclosure to reduce the vertical distance between sensors in a three element type reproduction element, to reduce the distance between shields, and to reduce the lead gap.

SUMMARY OF THE INVENTION

The embodiments disclosed generally relate to a magnetic recording head having three magnetoresistive effect elements. The structure comprises a first magnetoresistive effect element on a lower magnetic shield layer. Additionally, two lower electrodes are disposed on the two sides of the first magnetoresistive effect element. A second magnetoresistive effect element is disposed on a lower electrode while a third magnetoresistive effect element on another lower electrode. An upper magnetic shield layer is disposed between the second magnetoresistive effect element and the third magnetoresistive effect element. The upper magnetic shield also serves as an electrode of the first magnetoresistive effect element.

In one embodiment, a magnetic recording head comprises a first magnetoresistive effect element disposed on a first lower electrode; a second lower electrode disposed adjacent a first side of the first magnetoresistive effect element; a third lower electrode disposed adjacent a second side of the first magnetoresistive effect element; a second magnetoresistive effect element disposed on the second lower electrode; a third magnetoresistive effect element disposed on the third lower electrode; and a first upper electrode disposed between the second magnetoresistive effect element and the third magnetoresistive effect element.

In another embodiment, a magnetic recording head comprises a lower magnetic shield; a first upper electrode; and a first magnetoresistive effect element, a second magnetoresistive effective element and a third magnetoresistive effect element disposed between the lower magnetic shield and the first upper element. The second magnetoresistive effect element is disposed on the lower magnetic shield; the third magnetoresistive effect element is disposed on the lower magnetic shield; a first lower electrode is disposed on the lower magnetic shield and between the second magnetoresistive effect element and the third magnetoresistive effect element; the first magnetoresistive effect element is disposed on the first lower electrode; and the first upper electrode is disposed on the first magnetoresistive effect element.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments disclosed generally relate to a magnetic recording head having three magnetoresistive effect elements. The structure comprises a first magnetoresistive effect element on a lower magnetic shield layer. Additionally, two lower electrodes are disposed on the two sides of the first magnetoresistive effect element. A second magnetoresistive effect element is disposed on a lower electrode while a third magnetoresistive effect element on another lower electrode. An upper magnetic shield layer is disposed between the second magnetoresistive effect element and the third magnetoresistive effect element. The upper magnetic shield also serves as an electrode of the first magnetoresistive effect element.

Figure 1:
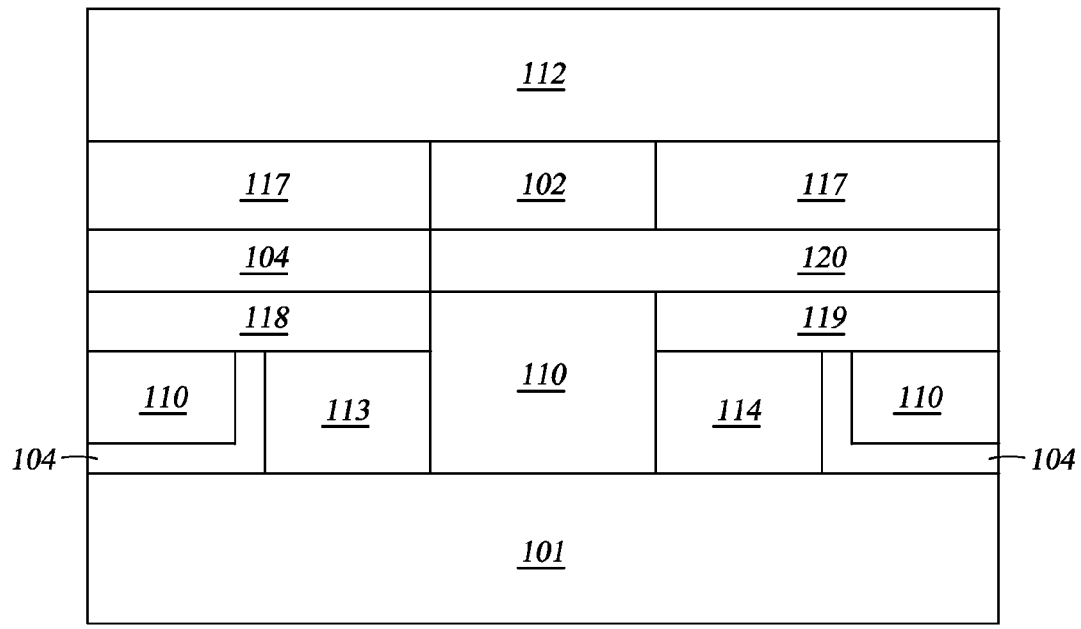
FIG. 1 is a schematic illustration of the configuration of a CPP magnetic recording head.
Figure 2:
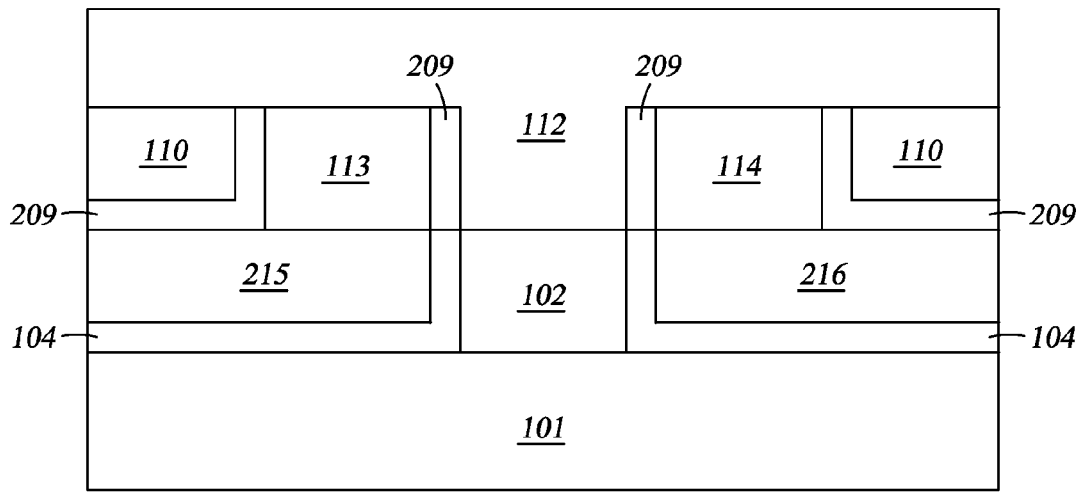
FIG. 2 is a schematic illustration of the configuration of a CPP magnetic recording head according to one embodiment.

FIG. 2 shows a configuration in principle of the disclosed embodiments. In the structure, the second lower electrode 215 and the third lower electrode 216 are provided on the two sides of the first magnetoresistive effect element 102, and the upper shield layer 112 is used as a common electrode for each of the magnetoresistive effect elements 102, 113, 114, so it is possible to reduce the distance between the three elements 102, 113, 114, and it is possible to reduce the distance between the lower magnetic shield layer 101 and the upper magnetic shield layer 112, so it is possible to have a narrow lead gap.

In general, the method of manufacturing the reproduction magnetic head includes: forming a lower magnetic shield layer 101; forming a magnetoresistive effect film 302 on the lower magnetic shield layer 101; forming a track pattern mask 303 on the magnetoresistive film 302; etching the magnetoresistive effect film 302 to form the magnetoresistive effect element 102; stacking an insulating layer 104 and lower electrode film 305 while leaving the track pattern mask 303 in place; removing the track pattern mask 303 and separating a second lower electrode 215 and a third lower electrode 216; forming a second magnetoresistive effect film 306 on the second lower electrode 215 and the third lower electrode 216; forming a second track pattern mask 308 on the second magnetoresistive effect film 306; etching the second magnetoresistive effect film 306 to form second and third magnetoresistive effect elements 113, 114; stacking a second insulating layer 209 and an element side layer 110 while leaving the track pattern mask 308 in place; forming a mask 311 for forming an upper shield; exposing a first magnetoresistive effect element 102 by removing a part of the second insulating layer that is exposed using the mask 311 for forming an upper shield as the mask; stacking an upper magnetic shield layer 112; and removing the mask 111 for forming the upper shield 112.

First Embodiment

Figure 3A:
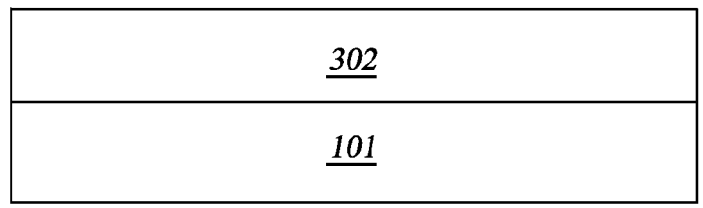
FIGS. 3A-3L are schematic illustrations of a CPP magnetic recording head at various stages of manufacturing according to the first embodiment.

Next, the process of manufacturing the reproduction magnetic head according to a first embodiment is explained with reference to FIGS. 3A-3L. As shown in FIG. 3A, a lower magnetic shield layer 101 made from NiFe is provided on an $Al_2O_3$—TiC wafer that forms a slider parent material, with an $Al_2O_3$ film therebetween (neither shown on the drawings). Next a magnetoresistive effect film 302 having a free layer, a barrier layer, and a fixed layer is formed using the sputtering method. The magnetoresistive effect film 302 is made from, for example, a 1 nm Ta substrate layer, a 5 nm IrMn antiferromagnetic layer, a 2 nm CoFeB fixed layer, a tunnel insulation layer made from MgO, and a free layer made from a stacked film of 5 nm of CoFeB and 2 nm of NiFe.

Figure 3B:
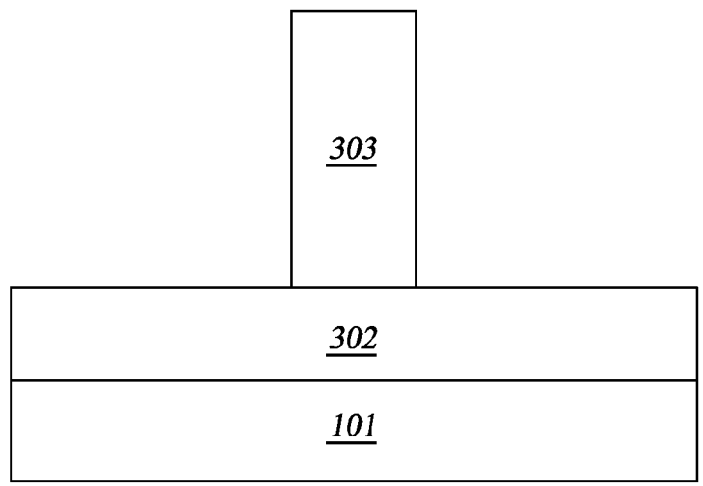

As shown in FIG. 3B, a track pattern mask 303 is formed on the magnetoresistive effect film 302 so as to provide at track width of 5 to 50 nm, for example 20 nm. Next, the magnetoresistive effect film 302 is etched using the track pattern mask 303 as a mask by Ar ion milling or RIE, to expose the lower shield layer 101 and form the first magnetoresistive effect element 102.

Figure 3C:
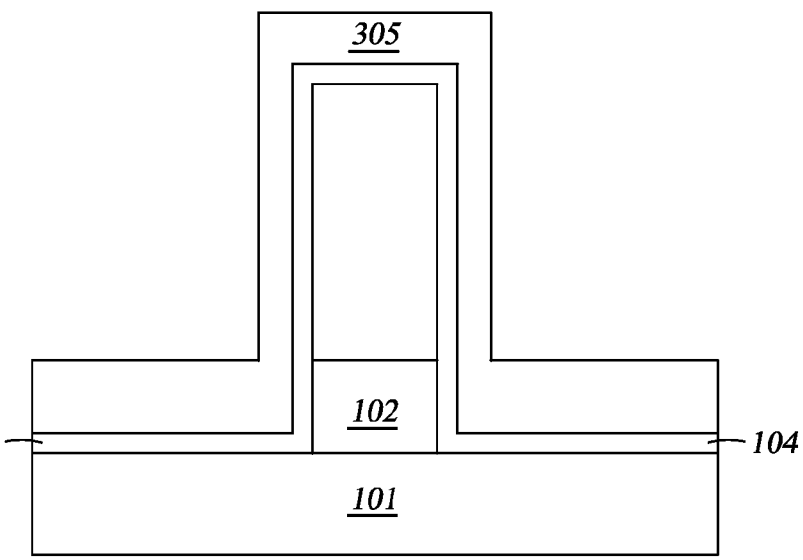

As shown in FIG. 3C, an insulating layer 104 is deposited as is a lower electrode 305. A material with low electrical resistivity may be used in the lower electrode 305. The lower electrode 305 and be combined with a side shield (not shown) in which case a soft magnetic material with a retention force of 3 Oe or less, a metal alloy including a soft magnetic material, or a stacked film that includes a soft magnetic material is preferable. The lower electrode may be combined with a magnetic domain control film; in which case a ferromagnetic material with retention force of 500 Oe or higher, a metal alloy that includes a ferromagnetic material, or a stacked film that includes a ferromagnetic material is preferable. In the embodiment shown in FIG. 3C, a lower electrode 305 made from CoPt having a thickness between 5 and 100 nm, for example, 13 nm, is deposited using the long throw sputtering method (LTS) which has excellent straightness.

Figure 3D:
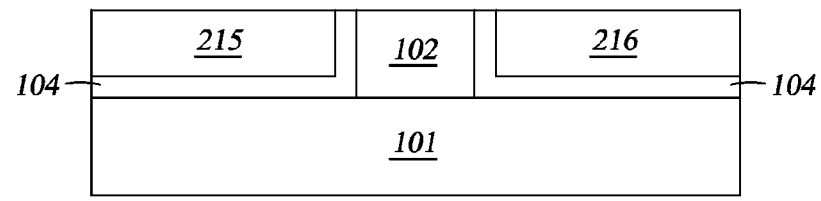
Figure 3E:
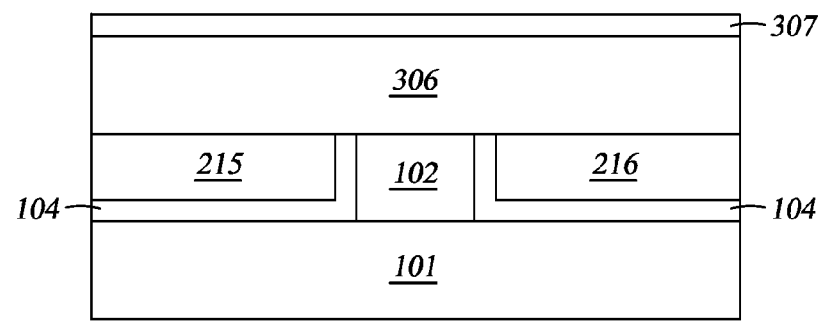

Next, the track pattern mask 303 is removed by lifting off or by chemical mechanical polishing (CMP) as shown in FIG. 3D. The lower electrode 305 is now divided to form the second lower electrode 215 and the third lower electrode 216. A second magnetoresistive effect film 306 is formed having a free layer, a barrier layer, and a fixed layer by the sputtering method as shown in FIG. 3E. The magnetoresistive effect film 306 is made from, for example, a 1 nm Ta substrate layer, a 5 nm IrMn antiferromagnetic layer, a 2 nm CoFeB fixed layer, a tunnel insulation film made from MgO, and a free layer made from a stacked film of 5 nm CoFeB, 2 nm NiFe. A CMP stopper layer 307 is formed. The CMP stopper layer 307 is preferably any of the metal materials Ta, Ti, W, Nb, V, Zr, and Ir, or, a metal alloy that includes these metals, or, an oxide that includes these metals, or, a nitride that includes these metals, or, any of SiC, SiN, and DLC.

Figure 3F:
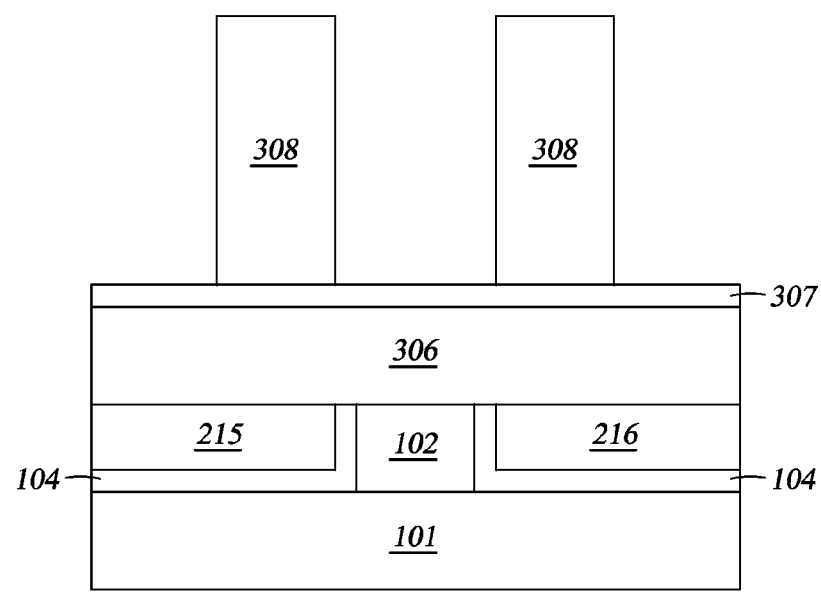

Next, a second track pattern mask 308 is formed on the CMP stopper layer 307 in which the track width is 5 to 30 nm, for example 20 nm, by spacer type double patterning using an ArF liquid immersion light exposure machine as shown in FIG. 3F. An ArF light exposure machine or an ArF liquid immersion light exposure machine may be used for forming the track mask 308. The light exposure machine may use normal light exposure and double patterning as the light exposure method, using an ArF light exposure machine or an ArF liquid immersion light exposure machine, or extreme ultraviolet lithography (EUV).

Figure 3G:
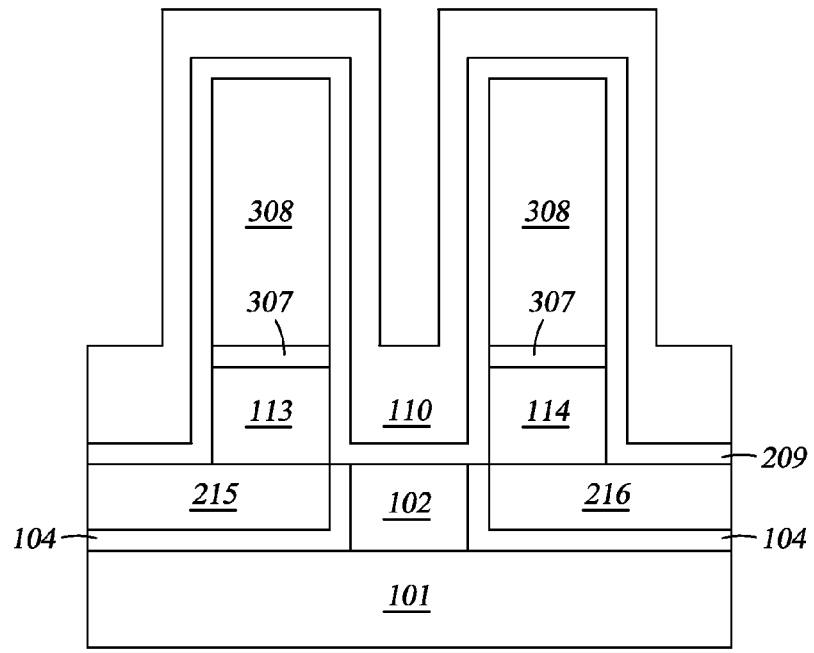

Next, the second magnetoresistive effect element 113 and the third magnetoresistive effect element 114 are formed by Ar ion milling or RIE using the second track patterning mask 308 as the mask, by etching the second magnetoresistive effect film 306 and exposing the second lower electrode 215 and the third lower electrode 216. Next, a second insulation film 209 is formed from $Al_2O_3$ with a thickness of 1 to 30 nm, for example, 2 nm, using the sputtering method as shown in FIG. 3G. Then, an element side layer 110 is deposited. The element side layer 110 may be combined with a side shield; in which case a soft magnetic material with a retention force of 3 Oe or less, a metal alloy that includes a soft magnetic material, or a stacked film that includes a soft magnetic material is preferable. The element side layer 110 may be combined with a magnetic domain control layer in which case a ferromagnetic material with a retention force of 500 Oe or higher, a metal alloy that includes a ferromagnetic material, or a stacked film that includes a ferromagnetic material is preferable. Here, after forming an insulating film 209 made from $Al_2O_3$ with a thickness of 1 to 30 nm, for example 2 nm, using the sputtering method, for example a side layer 110 made from CoPt with a thickness of 5 to 100 nm, for example 13 nm, is deposited using the long throw sputtering method (LTS), which has excellent straightness.

Figure 3H:
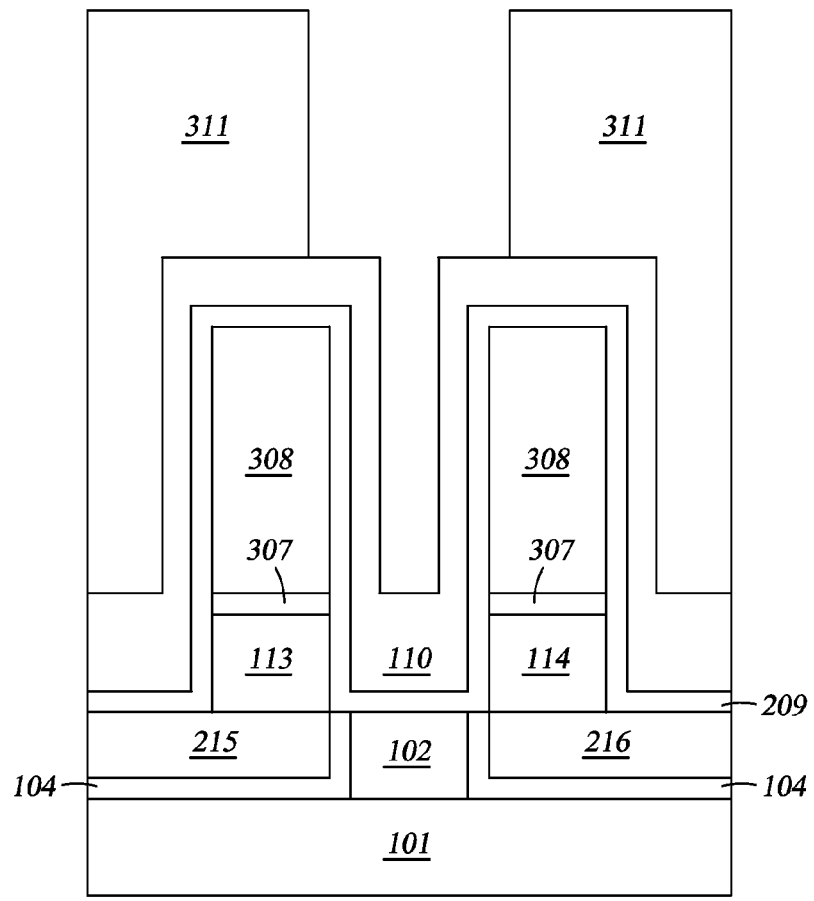
Figure 3I:
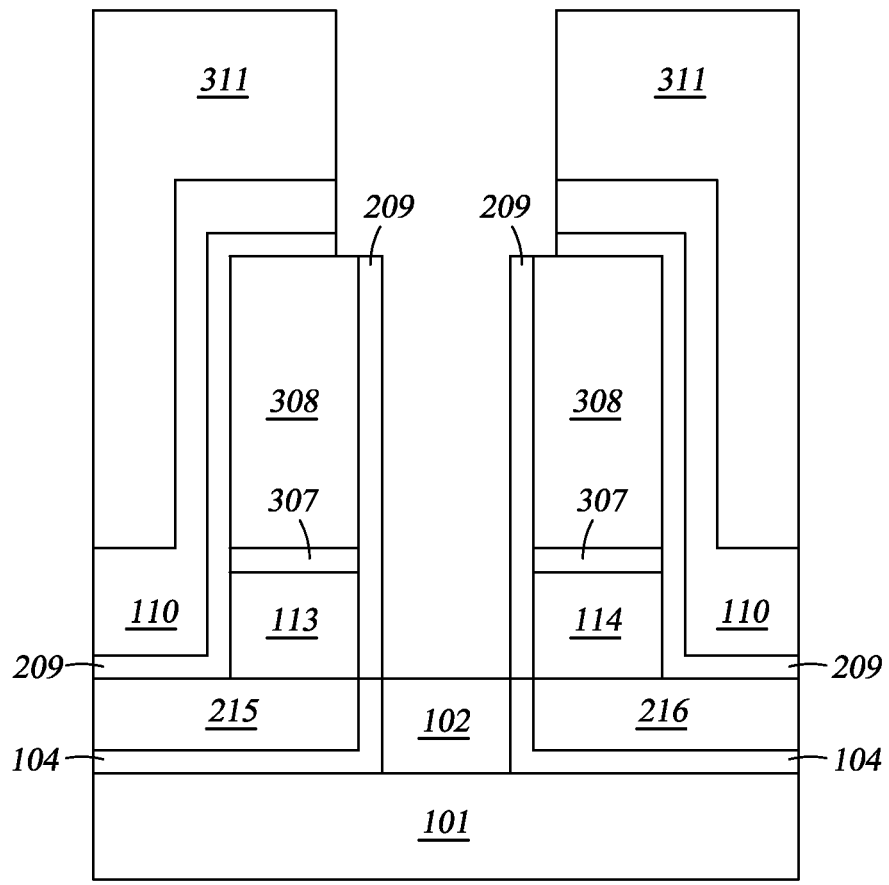

Next, a mask 311 for an upper shield is formed as shown in FIG. 3H. A portion of the second insulation layer 209 and a portion of the element side layer 110 are exposed by Ar ion milling or RIE using the mask 311 for the upper shield as a mask, to expose the first magnetoresistive effect element 102 as shown in FIG. 3I.

Figure 3J:
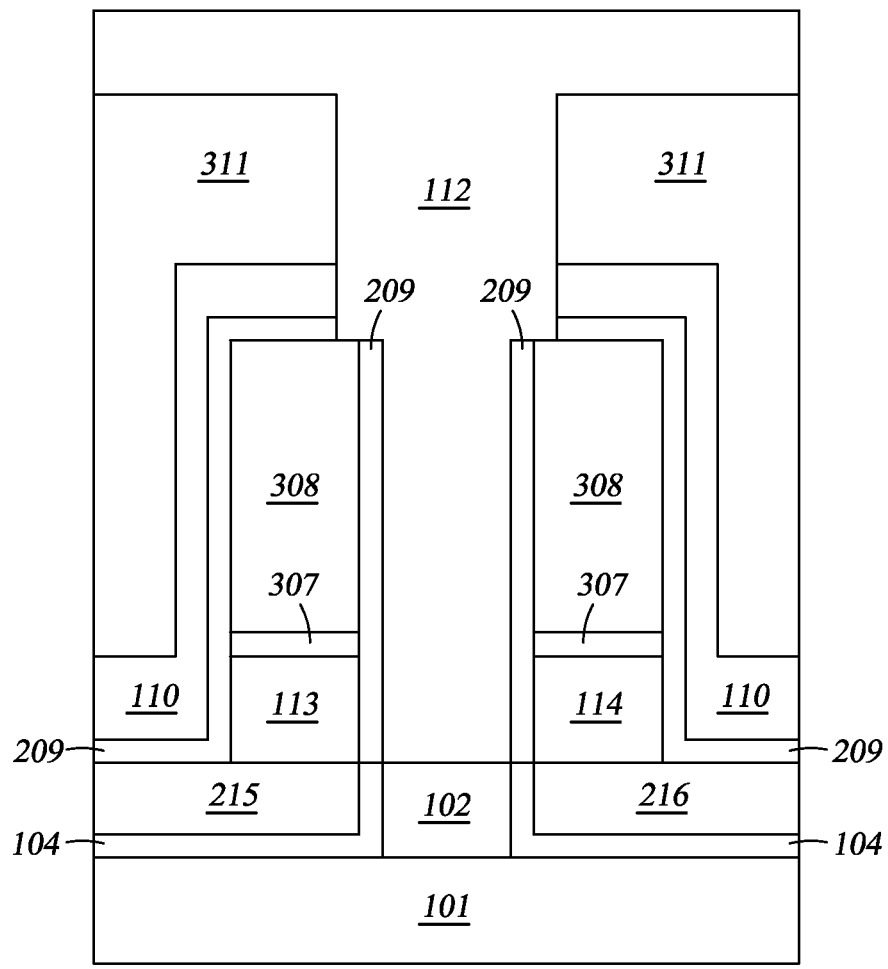
Figure 3K:
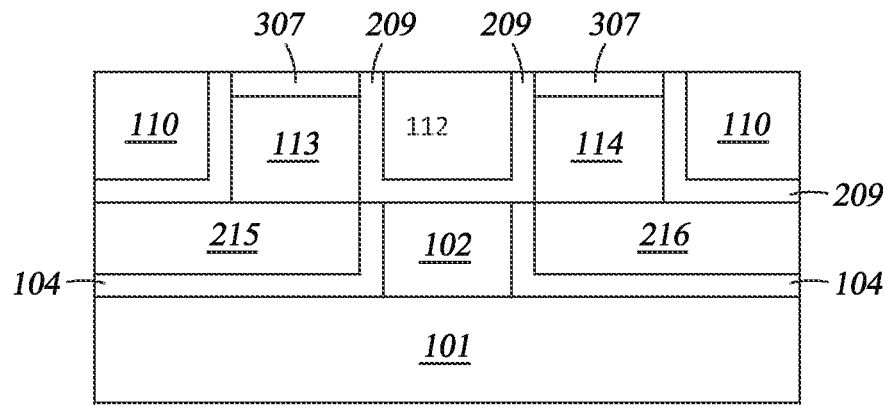
Figure 3L:
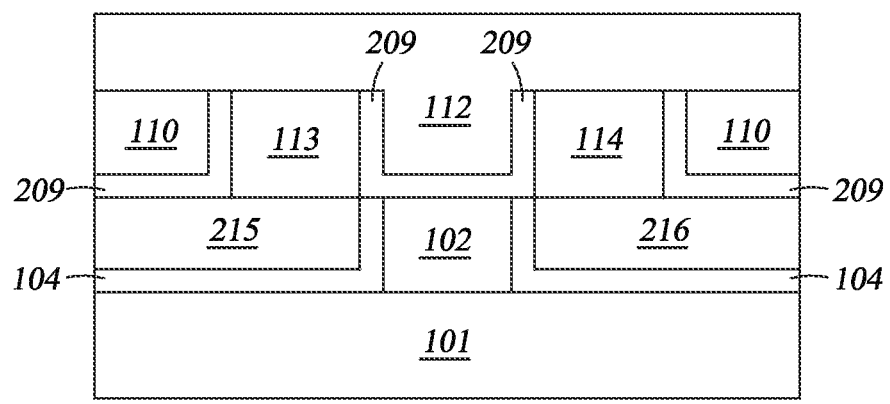

Next, an upper shield layer 112 made from NiFe is deposited by sputtering or by plating as shown in FIG. 3J. Then, the second insulation layer 209, the element side layer magnetic domain control film 110, the mask 311 for forming the upper shield, and the upper shield layer 112 deposited on the second track patterning mask 308 are removed by performing a flattening process by CMP using the CMP stopper layer 307 as a CMP stopper as shown in FIG. 3K. The CMP stopper layer 307 and a portion of the element side layer 110 are removed by Ar ion milling or RIE, then the upper magnetic shield layer 112 is provided using the sputtering method, to complete the basic configuration of the magnetic reproduction head according to the first embodiment as shown in FIG. 3L.

Second Embodiment

Figure 4A:
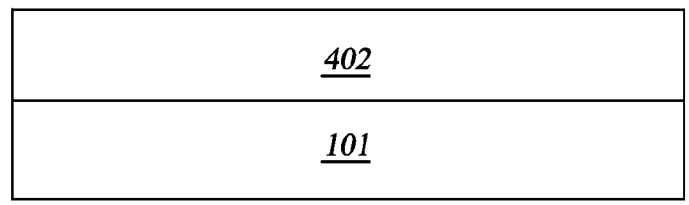
FIGS. 4A-4M are schematic illustrations of a CPP magnetic recording head at various stages of manufacturing according to the second embodiment.

Next, a manufacturing process for a magnetic reproduction head according to a second embodiment is explained with reference to FIGS. 4A-4M. First a lower magnetic shield layer 101 made from NiFe is provided on an $Al_2O_3$—TiC wafer that forms a slider parent material, with an $Al_2O_3$ film therebetween (neither shown on the drawings). Then, a magnetoresistive effect film 402 having a free layer, a barrier layer, and a fixed layer is formed using the sputtering method as shown in FIG. 4A. The magnetoresistive effect film 402 is made from, for example, a 1 nm Ta substrate layer, a 5 nm IrMn antiferromagnetic layer, a 2 nm CoFeB fixed layer, a tunnel insulation film made from MgO, and a free layer made from a stacked film of 5 nm of CoFeB and 2 nm of NiFe.

Figure 4B:
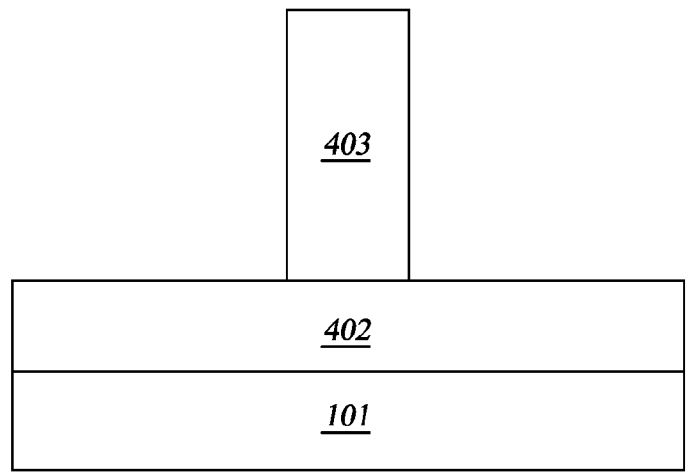
Figure 4C:
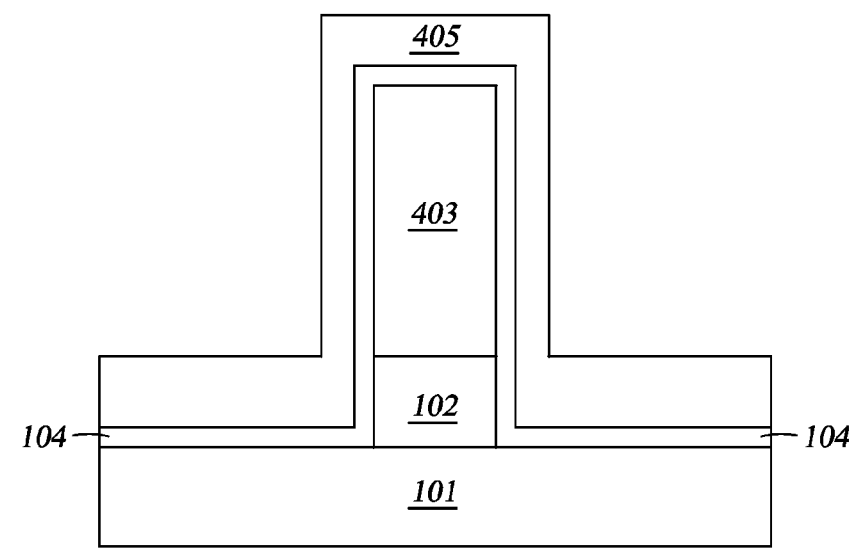

Next, a track pattern mask 403 is formed on the magnetoresistive effect film 402 so as to provide a track width of 5 to 50 nm, for example 20 nm as shown in FIG. 4B. Then, the magnetoresistive effect film 402 is etched using the track pattern mask 403 as a mask by Ar ion milling or RIE, to expose the lower shield layer 101 and form the first magnetoresistive effect element 102. A lower electrode 405 is deposited wherein a material with low electrical resistivity may be used. Also the lower electrode 405 can be combined with a side shield; in which case a soft magnetic material with retention force of 3 Oe or less, a metal alloy including a soft magnetic material, or a stacked film that includes a soft magnetic material is preferable. Additionally, the lower electrode 405 may be combined with a magnetic domain control film; in which this case a ferromagnetic material with retention force of 500 Oe or higher, a metal alloy that includes a ferromagnetic material, or a stacked film that includes a ferromagnetic material is preferable. As shown in FIG. 4C, a lower electrode 405 made from CoPt having a thickness between 5 and 100 nm, for example 13 nm, is deposited using the long throw sputtering method (LTS) which has excellent straightness as shown in FIG. 4C.

Figure 4D:
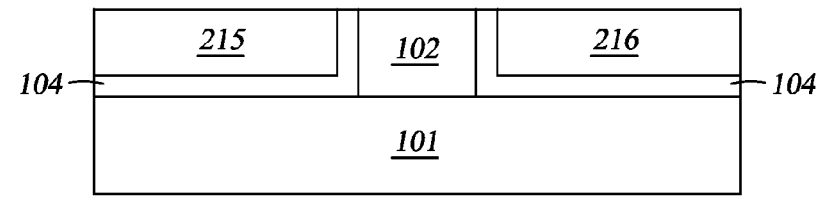
Figure 4E:
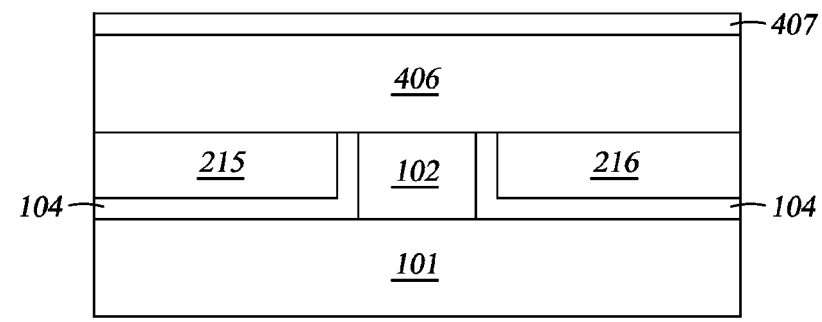

Next, the track pattern mask 403 is removed by lifting off or by chemical mechanical polishing (CMP) as shown in FIG. 4D such that the lower electrode 405 is divided to form the second lower electrode 215 and the third lower electrode 216. Thereafter, a second magnetoresistive effect film 406 is formed having a free layer, a barrier layer, and a fixed layer by the sputtering method. The magnetoresistive effect film 406 is made from, for example, a 1 nm Ta substrate layer, a 5 nm IrMn antiferromagnetic layer, a 2 nm CoFeB fixed layer, a tunnel insulation film made from MgO, and a free layer made from a stacked film of 5 nm CoFeB, 2 nm NiFe. A CMP stopper layer 407 then formed on the magnetoresistive effect film 406 as shown in FIG. 4E. The CMP stopper layer 407 is preferably any of the metal materials Ta, Ti, W, Nb, V, Zr, Ir, or, a metal alloy that includes these metals, or, an oxide that includes these metals, or, a nitride that includes these metals, or, any of SiC, SiN, and DLC.

Figure 4F:
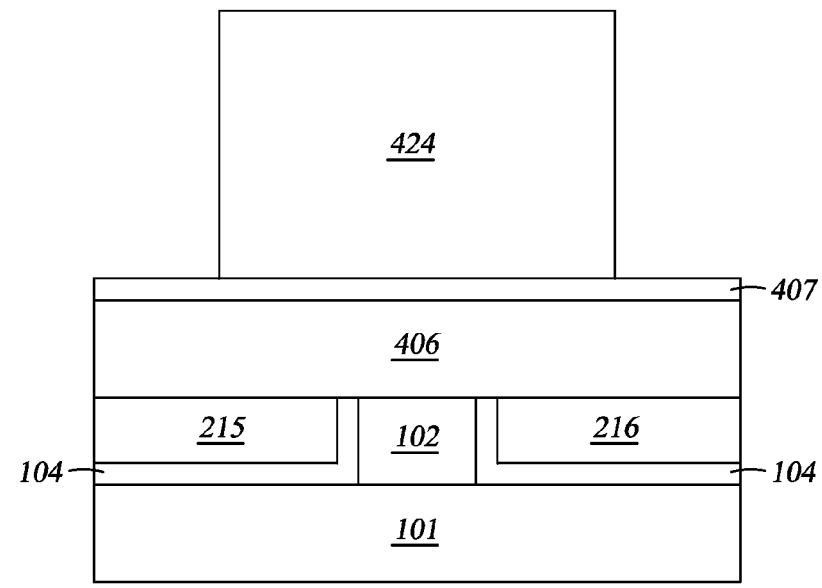

Next, a track wide pattern mask 424 is formed on the CMP stopper layer 407 in which the track width is 50 to 200 nm, for example 100 nm as shown in FIG. 4F.

Figure 4G:
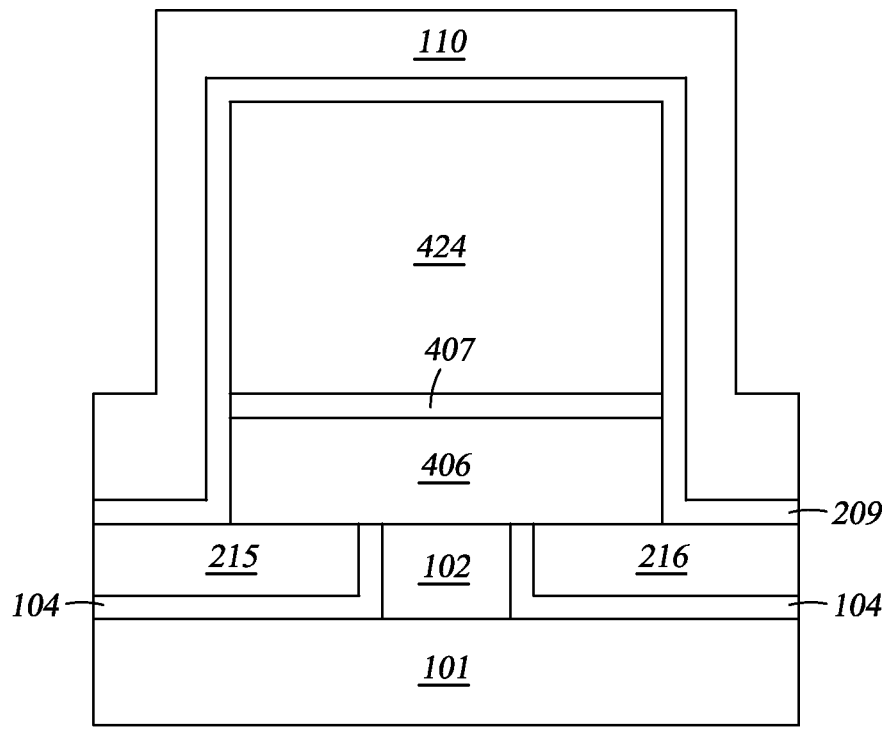

Next, the second magnetoresistive effect film 406 is etched by Ar ion milling or RIE using the track wide pattern mask 424 as a mask, to expose the second lower electrode 215 and the third lower electrode 216. Then, a second insulation film 209 is formed from $Al_2O_3$ with a thickness of 1 to 30 nm, for example 2 nm, using the sputtering method. Thereafter, an element side layer 110 is deposited. The element side layer 110 may be combined with a side shield; in which case a soft magnetic material with a retention force of 3 Oe or less, a metal alloy that includes a soft magnetic material, or a stacked film that includes a soft magnetic material is preferable. Additionally, the element side layer 110 may be combined with a magnetic domain control layer; in which case a ferromagnetic material with a retention force of 500 Oe or higher, a metal alloy that includes a ferromagnetic material, or a stacked film that includes a ferromagnetic material is preferable. Here, after forming an insulating film 209 made from $Al_2O_3$ with a thickness of 1 to 30 nm, for example 2 nm, using the sputtering method, side layer 110 made from CoPt with a thickness of 5 to 100 nm, for example 13 nm, is deposited using the long throw sputtering method (LTS), which has excellent straightness as shown in FIG. 4G.

Figure 4H:
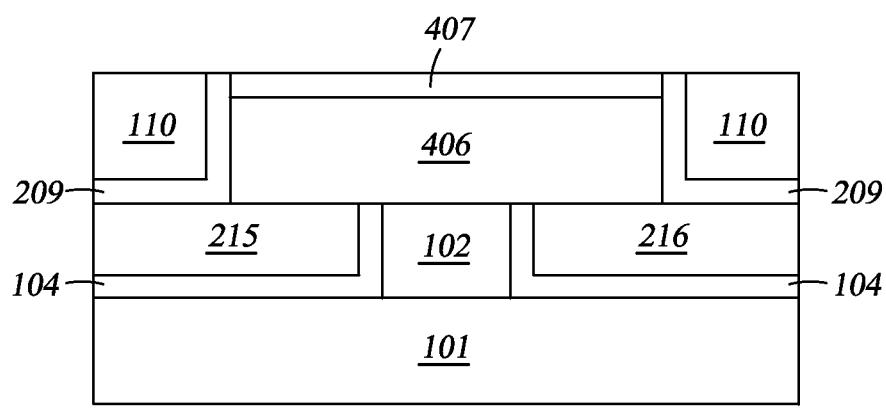

Thereafter, the second insulation layer 209 and the element side layer magnetic domain control film 110 deposited on the track wide pattern mask 424 are removed by carrying out a flattening process by CMP using the CMP stopper layer 407 as a CMP stopper, and flattening the surface as shown in FIG. 4H.

Figure 4I:
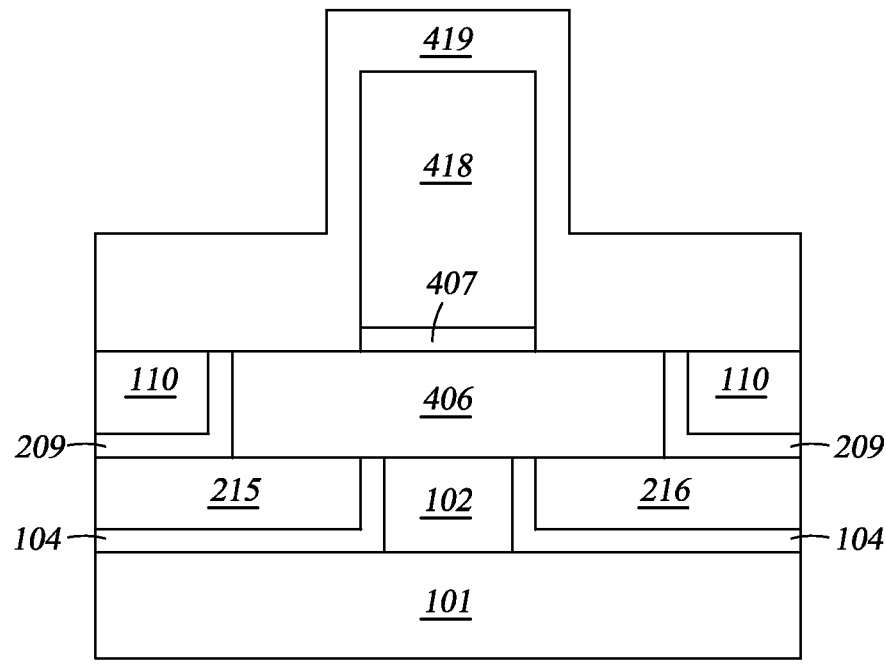

Next, a pattern mask 418 with a mask width of 20 to 100 nm, for example 30 nm, is formed on the CMP stopper layer 407 as shown in FIG. 4I. After removing a portion of the exposed CMP stopper layer 407 and a portion of the element side layer 110 by Ar ion milling using the pattern mask 418 as a mask, an upper electrode forming film 419 is formed covering the mask pattern 418. Preferably, the upper electrode forming film 419 is a material with low electrical resistivity.

Figure 4J:
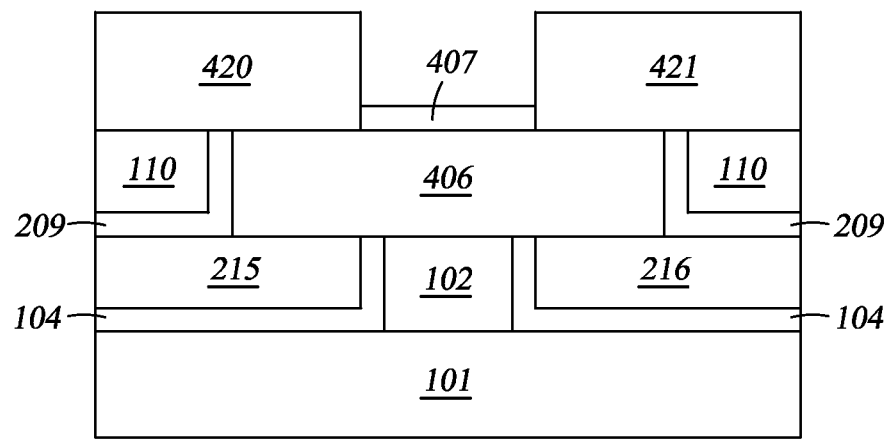

Then, the mask pattern 418 is removed by lifting off or by chemical mechanical polishing (hereafter referred to as CMP) as shown in FIG. 4J. The upper electrode forming film 419 is divided to form the second upper electrode 420 and the third upper electrode 421.

Figure 4K:
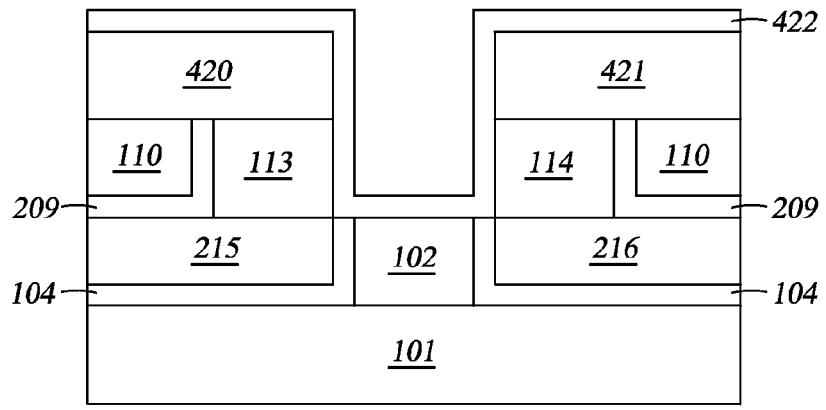
Figure 4L:
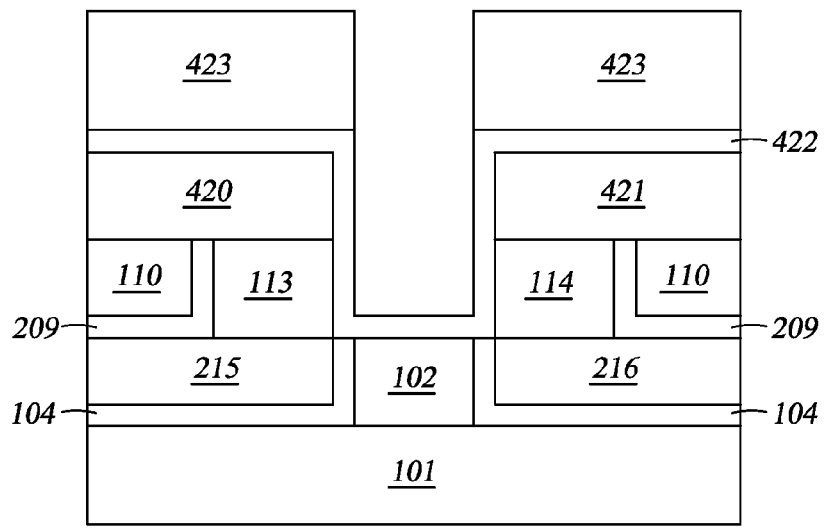

Next, a third insulation layer 422 made from $Al_2O_3$ is formed on the second upper electrode 420 and the third upper electrode 421 using the sputtering method and having a thickness of 1 to 30 nm, for example 2 nm as shown in FIG. 4K. Then, a trench pattern 423 is formed over the third insulation layer 422 as shown in FIG. 4L. The third insulation layer 422 is removed by Ar ion milling using a trench pattern 423 as a mask, to expose the first magnetoresistive effect element 102.

Figure 4M:
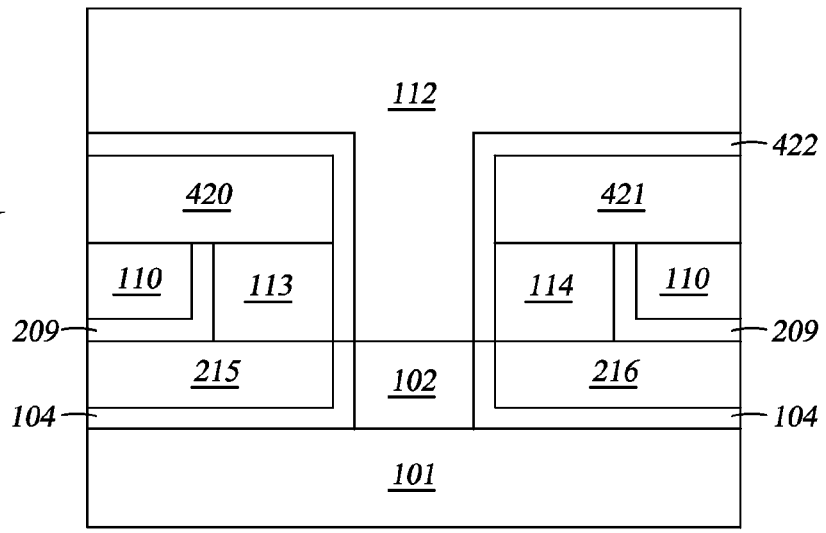

After removing the trench pattern 423 by lifting off, an upper magnetic shield layer 112 is provided by the sputtering method, thereby completing the basic configuration of the magnetic reproduction head according to the second embodiment as shown in FIG. 4M.

Third Embodiment

Figure 5A:
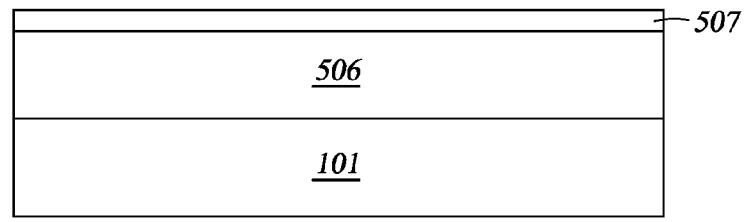
FIGS. 5A-5M are schematic illustrations of a CPP magnetic recording head at various stages of manufacturing according to the first embodiment.

Next, a process of manufacturing a magnetic reproduction head according to a third embodiment is explained with reference to FIGS. 5A-5M. First, a lower magnetic shield layer 101 made from NiFe is provided on an $Al_2O_3$—TiC wafer that forms a slider parent material, with an $Al_2O_3$ film therebetween (neither shown on the drawings). Next a second magnetoresistive effect film 506 having a free layer, a barrier layer, and a fixed layer is formed using the sputtering method as shown in FIG. 5A. The magnetoresistive effect film 506 is made from, for example, a 1 nm Ta substrate layer, a 5 nm IrMn antiferromagnetic layer, a 2 nm CoFeB fixed layer, a tunnel insulation layer made from MgO, and a free layer made from a stacked film of 5 nm of CoFeB and 2 nm of NiFe. Then, a CMP stopper layer 507 is formed. The CMP stopper layer 507 is preferably any of the metal materials Ta, Ti, W, Nb, V, Zr, Ir, or, a metal alloy that includes these metals, or, an oxide that includes these metals, or, a nitride that includes these metals, or, any of SiC, SiN, and DLC.

Figure 5B:
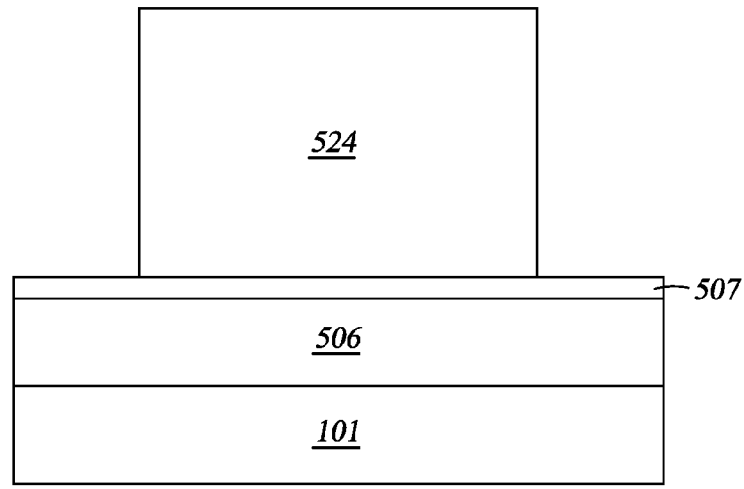
Figure 5C:
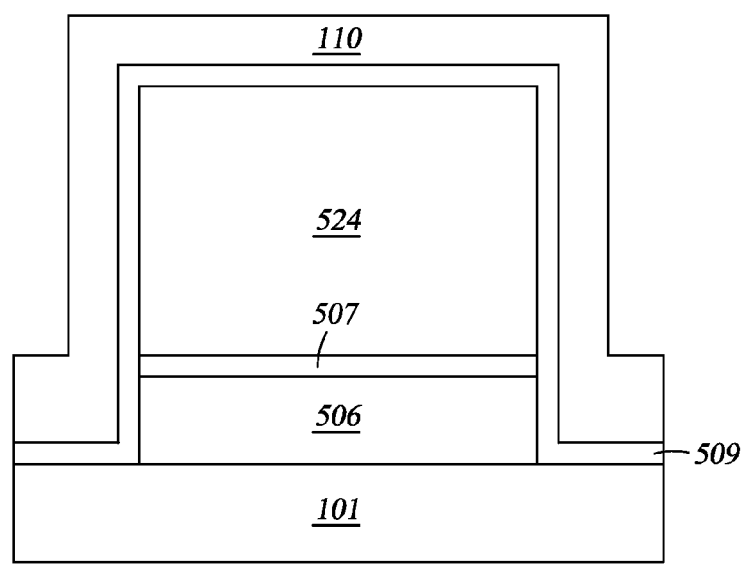

Next, a track wide pattern mask 524 is formed on the CMP stopper layer 507 in which the track width is 50 to 200 nm, for example 100 nm, as shown in FIG. 5B. The second magnetoresistive effect film 506 is etched by Ar ion milling or RIE using the using the track wide pattern mask 524 as a mask, to expose the lower magnetic shield layer 101. A second insulation film 509 is formed from $Al_2O_3$ with a thickness of 1 to 30 nm, for example 2 nm, using the sputtering method. The element side layer 110 is deposited. The element side layer 110 may be combined with a side shield; in which case a soft magnetic material with a retention force of 3 Oe or less, a metal alloy that includes a soft magnetic material, or a stacked film that includes a soft magnetic material is preferable. Additionally, the element side layer 110 may be combined with a magnetic domain control layer; in which case a ferromagnetic material with a retention force of 500 Oe or higher, a metal alloy that includes a ferromagnetic material, or a stacked film that includes a ferromagnetic material is preferable. After forming the insulating film 509 made from $Al_2O_3$ with a thickness of 1 to 30 nm, for example 2 nm, using the sputtering method, for example an element side layer 110 made from CoPt with a thickness of 5 to 100 nm, for example 13 nm, is deposited using the long throw sputtering method (LTS), which has excellent straightness as shown in FIG. 5C.

Figure 5D:
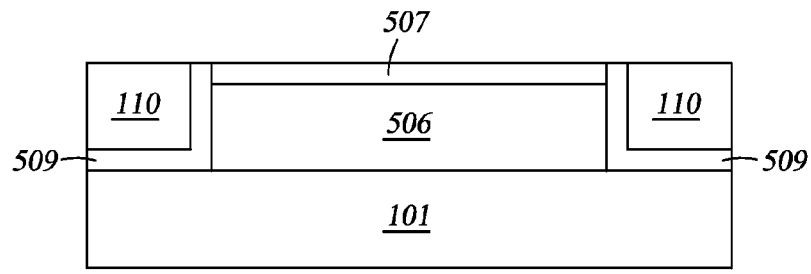
Figure 5E:
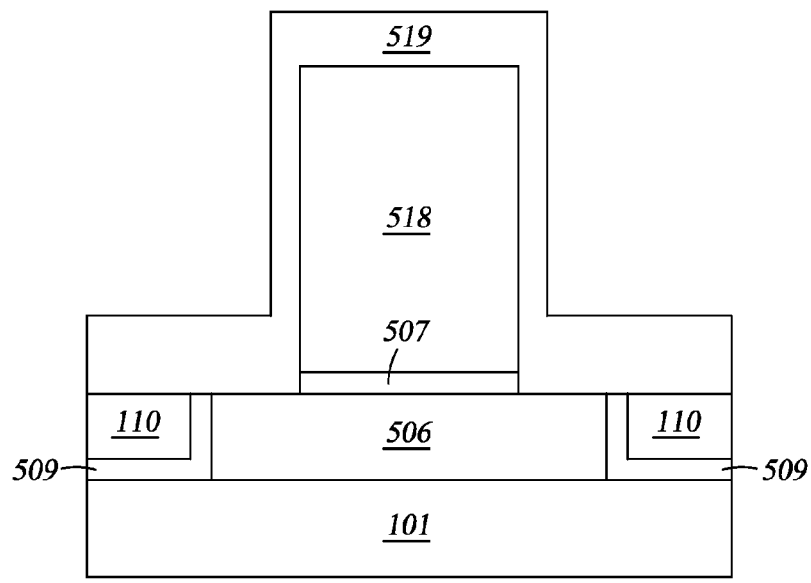

The second insulation layer 509 and the element side layer magnetic domain control film 110 deposited on the track wide pattern mask 524 are removed by carrying out a flattening process by CMP using the CMP stopper layer 507 as a CMP stopper, and flattening the surface as shown in FIG. 5D. A pattern mask 518 with a mask width of 20 to 100 nm, for example 30 nm, is formed on the CMP stopper layer 507. After removing a portion of the exposed CMP stopper layer 507 and a portion of the element side layer 110 by Ar ion milling using the pattern mask 518 as a mask, an upper electrode forming film 519 is formed covering the mask pattern 518 as shown in FIG. 5E. The upper electrode forming film 519 is a material with low electrical resistivity.

Figure 5F:
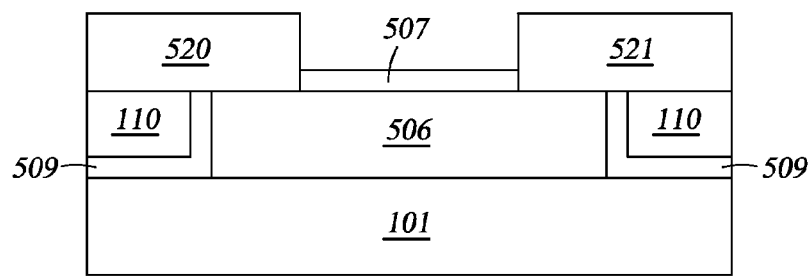

The mask pattern 518 is removed by lifting off or by chemical mechanical polishing (hereafter referred to as CMP) as shown in FIG. 5F. The upper electrode forming film 519 is divided to form the second upper electrode 520 and the third upper electrode 521.

Figure 5G:
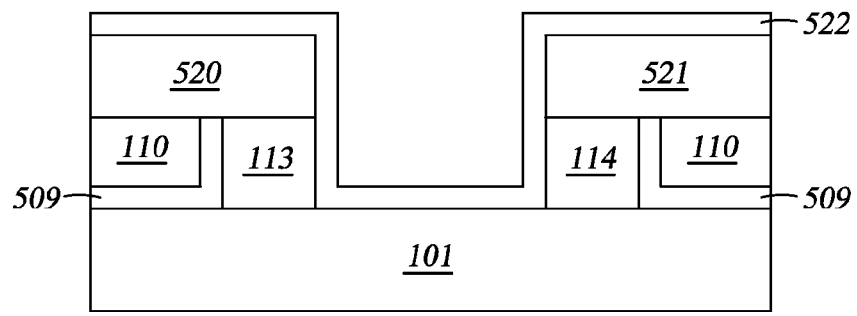
Figure 5H:
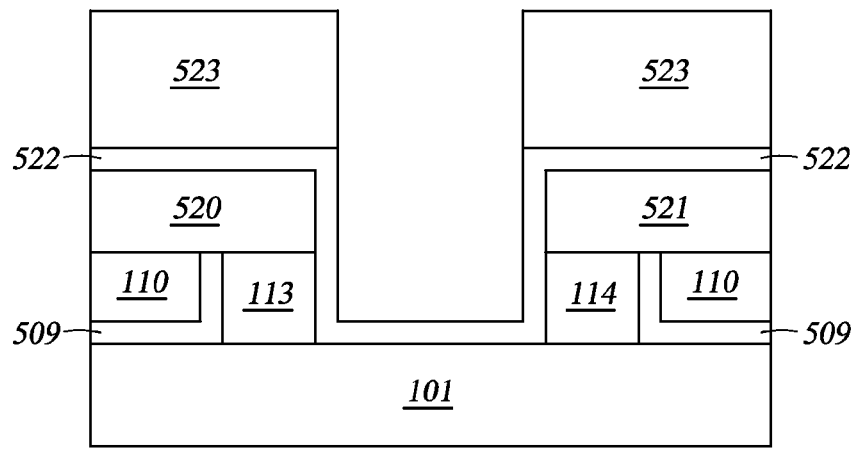

A third insulation layer 522 made from $Al_2O_3$ is formed on the second upper electrode 520 and the third upper electrode 521 using the sputtering method and having a thickness of 1 to 30 nm, for example 2 nm as shown in FIG. 5G. Thereafter, a trench pattern 523 is formed as shown in FIG. 5H. The third insulation layer 522 is removed by Ar ion milling using the trench pattern 523 as a mask, to expose the lower shield 101.

Figure 5I:
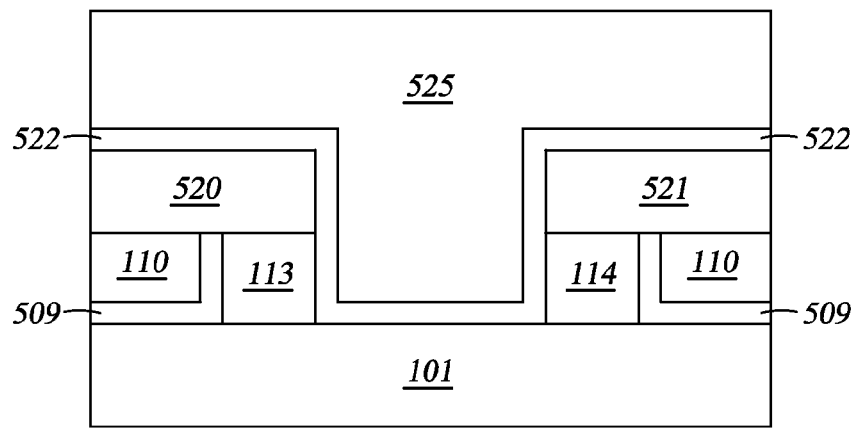

After removing the trench pattern 523 by lifting off, a first lower electrode 525 is formed as shown in FIG. 5I. The first lower electrode 525 may be combined with a magnetic shield; in which case a soft magnetic material with retention force of 3 Oe are less, a metal alloy that contains a soft magnetic material, or a stacked film that contains a soft magnetic material is preferable. In the embodiment shown in FIG. 5I, a film of NiFe with thickness of 1 to 50 nm, for example 30 nm, is formed using the sputtering method.

Figure 5J:
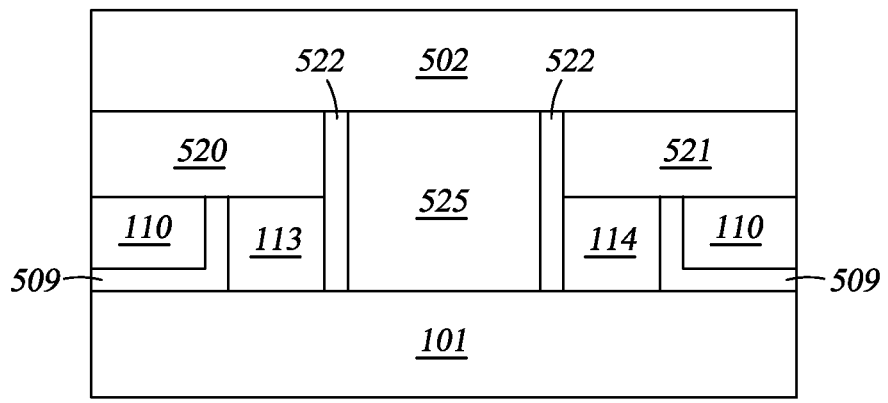
Figure 5K:
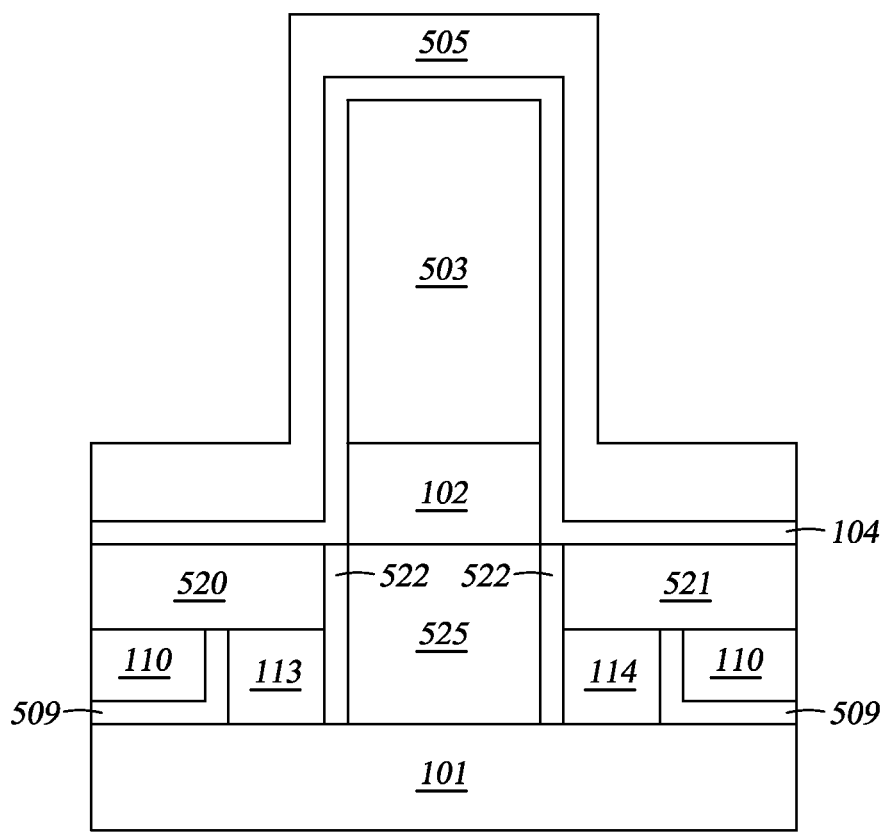

Next, a flattening process is carried out by ion milling or CMP, and then a magnetoresistive effect film 502 having a free layer, a barrier layer, and a fixed layer is formed using the sputtering method as shown in FIG. 5J. The magnetoresistive effect film 502 is made from, for example, a 1 nm Ta substrate layer, a 5 nm IrMn antiferromagnetic layer, a 2 nm CoFeB fixed layer, a tunnel insulation film made from MgO, and a free layer made from a stacked film of 5 nm CoFeB, 2 nm NiFe.

Then, a track pattern mask 503 is formed on the magnetoresistive effect film 502 provided with a track width of 5 to 50 nm, for example 20 nm. The magnetoresistive effect film 502 is etched by Ar ion milling or RIE using the track pattern mask 503 as a mask, to expose the second upper electrode 520 and the third upper electrode 521 and form the first magnetoresistive effect element 102. Thereafter, a lower electrode 505 is deposited. The material may be a low electrical resistivity material. Additionally, the lower electrode 505 may be combined with a side shield; in which case a soft magnetic material having a retention force of 3 Oe or less, a metal alloy that includes a soft magnetic material, or a stacked film that includes a soft magnetic material is preferable. The lower electrode 505 may also be combined with a magnetic domain control film; in which case a ferromagnetic material having a retention force of 500 Oe or higher, a metal alloy that includes a ferromagnetic material, or a stacked film that includes a ferromagnetic material is preferable. In the embodiment shown in FIG. 5K, the lower electrode 505 is made from CoPt having a thickness of 5 to 100 nm, for example 13 nm, is deposited using the long throw sputtering method (LTS) which has excellent straightness.

Figure 5L:
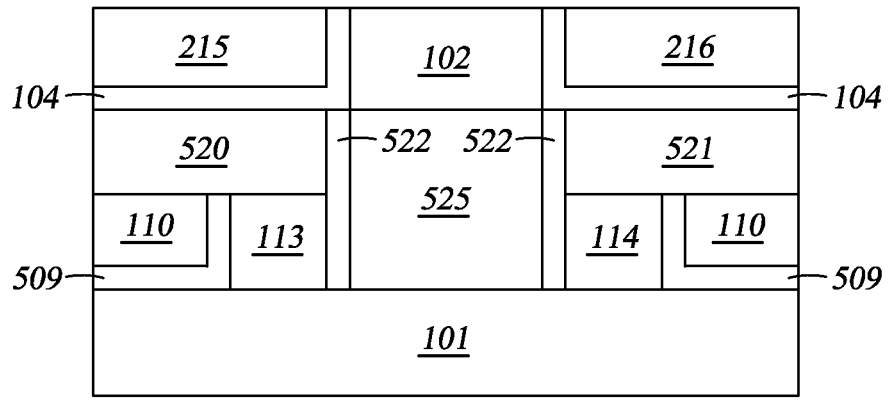
Figure 5M:
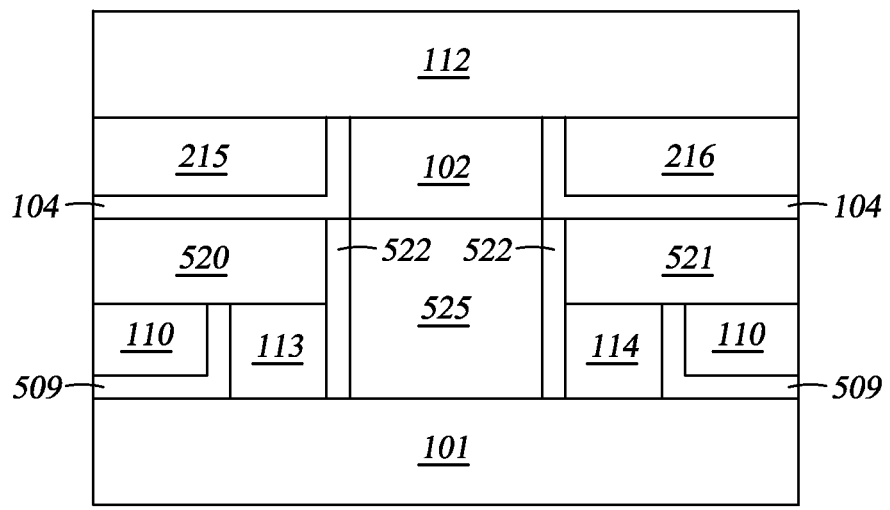

Next, the track pattern mask 503 is removed by lifting off or by chemical mechanical polishing (hereafter referred to as CMP) as shown in FIG. 5L. The lower electrode 505 is divided to form the second lower electrode 215 and the third lower electrode 216. Finally, the upper magnetic shield layer 112 is provided using the sputtering method, to complete the basic configuration of the magnetic reproduction head according to the third embodiment as shown in FIG. 5M.

As shown in FIGS. 2, 3L, 4M and 5M, the magnetoresistive effect elements are closer together and thus, the vertical distance between sensors is reduced, the distance between shields is reduced, and the lead gap is reduced.

While the foregoing is directed to exemplary embodiments, other and further embodiments of the invention may be devised without departing from the basic scope thereof, and the scope thereof is determined by the claims that follow.

What is claimed is:

1. A magnetic recording head, comprising:
    a first magnetoresistive effect element disposed on a first lower electrode;
    a second lower electrode disposed adjacent a first side of the first magnetoresistive effect element;
    a third lower electrode disposed adjacent a second side of the first magnetoresistive effect element;
    a second magnetoresistive effect element disposed on the second lower electrode;
    a third magnetoresistive effect element disposed on the third lower electrode; and
    a first upper electrode disposed between the second magnetoresistive effect element and the third magnetoresistive effect element.

2. The magnetic recording head of claim 1, further comprising a first insulating layer disposed on the first lower electrode, and between the first side of the first magnetoresistive effect element and the second lower electrode.

3. The magnetic recording head of claim 2, wherein the first insulating layer is further disposed between the second side of the first magnetoresistive effect element and the third lower electrode.

4. The magnetic recording head of claim 3, further comprising a second insulating layer disposed between the second magnetoresistive effect element and the first upper electrode.

5. The magnetic recording head of claim 4, wherein the second insulating layer is further disposed between the third magnetoresistive effect element and the first upper electrode.

6. The magnetic recording head of claim 5, wherein the first upper electrode is disposed on the first magnetoresistive effect element.

7. The magnetic recording head of claim 6, wherein the first upper electrode is disposed on the second magnetoresistive effect element.

8. The magnetic recording head of claim 7, wherein the first upper electrode is disposed on the third magnetoresistive effect element.

9. The magnetic recording head of claim 8, wherein the first upper electrode comprises Ir, Ru, W, Au, Ag, Cu, Mo, Ni, Co, or Fe, a metal alloy that includes these metals, or a stacked film that includes these metals.

10. The magnetic recording head of claim 9, wherein the second lower electrode and the third lower electrode each comprise Ir, Ru, W, Au, Ag, Cu, Mo, Ni, Co, or Fe, a metal alloy that includes these metals, or a stacked film that includes these metals.

11. The magnetic recording head of claim 1, further comprising:
    a second upper electrode coupled to the second magnetoresistive effect element; and
    a third upper electrode coupled to the third magnetoresistive effect element, wherein an insulating layer is disposed between the first upper electrode and both the second magnetoresistive effect element and the third magnetoresistive effect element, and wherein the first upper electrode is disposed on the first magnetoresistive effect element.

* * * * *